(12) United States Patent
Howorth

(10) Patent No.: US 8,673,229 B2
(45) Date of Patent: Mar. 18, 2014

(54) COMPOSITIONS CONTAINING BIOSOLUBLE INORGANIC FIBERS AND MICACEOUS BINDERS

(75) Inventor: Gary F. Howorth, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1638 days.

(21) Appl. No.: 10/488,710

(22) PCT Filed: Oct. 9, 2002

(86) PCT No.: PCT/US02/32350
§ 371 (c)(1),
(2), (4) Date: Mar. 5, 2004

(87) PCT Pub. No.: WO03/031368
PCT Pub. Date: Apr. 17, 2003

(65) Prior Publication Data
US 2004/0234436 A1    Nov. 25, 2004

Related U.S. Application Data

(60) Provisional application No. 60/328,646, filed on Oct. 9, 2001.

(51) Int. Cl.
*C03C 13/06* (2006.01)

(52) U.S. Cl.
USPC .............. 422/179; 422/221; 501/36; 523/179

(58) Field of Classification Search
USPC ................... 422/177, 179, 180, 221; 501/36; 523/179
See application file for complete search history.

(56) References Cited

U.S. PATENT DOCUMENTS

| | | | |
|---|---|---|---|
| 2,051,279 A | 8/1936 | Thorndyke et al. | |
| 2,155,107 A | 4/1939 | Tyler et al. | |
| 2,576,312 A | 11/1951 | Minnick | |
| 3,001,571 A * | 9/1961 | Hatch | 428/292.1 |
| 3,458,329 A | 7/1969 | Owens et al. | |
| 3,799,836 A | 3/1974 | Rogers et al. | |
| 3,916,057 A | 10/1975 | Hatch et al. | |
| 3,947,707 A | 3/1976 | Shannon et al. | |
| 4,036,654 A | 7/1977 | Yale et al. | |
| 4,054,472 A | 10/1977 | Kondo et al. | |
| 4,153,439 A | 5/1979 | Tomić et al. | |
| 4,238,213 A | 12/1980 | Pallo et al. | |
| 4,305,992 A | 12/1981 | Langer et al. | |
| 4,325,724 A | 4/1982 | Froberg | |
| 4,342,581 A | 8/1982 | Neubauer et al. | |
| 4,351,054 A | 9/1982 | Olds | |
| 4,366,251 A | 12/1982 | Rapp | |
| 4,385,135 A * | 5/1983 | Langer et al. | 422/179 |
| 4,521,333 A | 6/1985 | Graham et al. | |
| 4,615,988 A | 10/1986 | Le Moigne et al. | |
| 4,693,740 A | 9/1987 | Noiret et al. | |
| 4,929,429 A | 5/1990 | Merry | |
| 5,207,989 A | 5/1993 | MacNeil | |
| 5,242,871 A | 9/1993 | Hashimoto et al. | |
| 5,248,637 A | 9/1993 | Taneda et al. | |
| 5,254,410 A | 10/1993 | Langer et al. | |
| 5,290,522 A | 3/1994 | Rogers et al. | |
| 5,332,699 A | 7/1994 | Olds et al. | |
| 5,523,059 A | 6/1996 | Langer | |
| 5,585,312 A | 12/1996 | TenEyck et al. | |
| 5,705,444 A | 1/1998 | Tompkins et al. | |
| 5,714,421 A * | 2/1998 | Olds et al. | 501/36 |
| 5,736,109 A | 4/1998 | Howorth et al. | |
| 5,853,675 A | 12/1998 | Howorth | |
| 5,869,010 A | 2/1999 | Langer | |
| 5,874,375 A | 2/1999 | Zoitos et al. | |
| 6,051,193 A | 4/2000 | Langer et al. | |
| 6,245,301 B1 * | 6/2001 | Stroom et al. | 422/179 |
| 2001/0024626 A1 | 9/2001 | TenEyck | |

FOREIGN PATENT DOCUMENTS

| | | |
|---|---|---|
| CA | 588493 | 12/1959 |
| EP | 0 076 677 A1 | 4/1983 |
| EP | 0 144 349 B1 | 6/1985 |
| EP | 1 388 649 A1 | 2/2004 |
| GB | 520 247 | 4/1939 |
| GB | 810 773 | 3/1959 |
| GB | 1 209 244 | 10/1970 |
| GB | 1 273 205 | 5/1972 |
| GB | 1 399 556 | 7/1975 |
| GB | 1 446 910 | 8/1976 |
| GB | 2 083 017 A | 3/1982 |
| GB | 2 122 537 A | 1/1984 |
| GB | 2 150 553 A | 7/1985 |
| JP | 51-13819 | 2/1976 |
| JP | 51-43429 | 4/1976 |
| JP | 51-133311 | 11/1976 |
| JP | 56-54252 | 5/1981 |
| WO | WO 85/02394 | 6/1985 |
| WO | WO 93/15208 | 8/1993 |

OTHER PUBLICATIONS

"*Standard Test Methods for Fire Tests of Building Construction and Materials*", Reproduced by Global Engineering, American Society for Testing and Materials, Designation: E 119-88$^{E1}$, Philadelphia, PA, (1988).
"*Insulating Fiber Products*", Manville, P.O. Box 5106, Denver, CO 80217-5106, New Superwool™ Brochure.
"*Recycling in the Steel Industry*", Proceedings of the 1$^{st}$ Process Technology Conference, vol. 1, Washington D.C. Meeting Mar. 25-26, 1980, Sponsored by the Process Technology Division Iron and Steel Society of the American Institute of Mining, Metallurgical, and Petroleum Engineers.

(Continued)

Primary Examiner — Randy Boyer

(57) ABSTRACT

Compositions that include a mixture of biosoluble inorganic fibers and a micaceous binder are described. The compositions can be prepared free of refractory ceramic fibers that are respirable but durable in a physiological medium. The compositions are typically in the form of a sheet material or a paste and can be used, for example, as a protective packing material around the pollution control element or as an insulating material in the end cone region in a pollution control device. Sheet materials formed from the compositions have an area of a X-Y plane that decrease less than about 6 percent when heated to about 900° C.

32 Claims, 3 Drawing Sheets

(56) References Cited

OTHER PUBLICATIONS

H. Förster, "*The Behaviour of Mineral Fibres in Physiological Solutions*", Proceedings of 1982 WHO IARC Conference, Copenhagen, vol. 2, pp. 27-55 (1988).

Ohta et al., "Chemical Durability of Glasses in the Systems $SiO_2$-$CaO$-$Na_2O$-$R_mO_n$", *Ceramic Bulletin,* vol. 57, No. 6 pp. 602-604 (1978).

Dietrichs et al., "*Properties, High-temperature Behaviour and Service Conditions Of Ceramic Fibres*", Institute for Petrology of the RWTH (Rhineland-Westphalian Technical University) at Aachen, vol. 30, Issue No. 7/8, Jul./Aug. 1981.

Ethridge et al., "Effects of Glass Surface Area to Solution Volume Ratio On Glass Corrosion", Department of Materials Science and Engineering, Ceramics Division, Univeristy of Florida, *Physics and Chemistry of Glasses,* vol. 20, No. 2, pp. 33-40 Apr. 1979.

Luce et al., "Dissolution Kinetics of Magnesium Silicates", *Geochimica et Cosmochimica Acta,* vol. 36, pp. 35-50 (1972) Pergamon Press.

Paul Gross M.D., "Man-Made Vitreous Fibers: An Overview of Studies On Their Biologic Effects", *Am. Ind. Hyg. Assoc. J.,* (47), pp. 717-723, Nov. 1986.

Janet R. Gronow, The Dissolution of Asbestos Fibres in Water, *Clay Minerals,* vol. 22, pp. 21-35, (1987).

Bledzki et al., "Corrosion Phenomena in Glass Fibers and Glass Fiber Reinforced Thermosetting Resins", *Composites Science and Technology,* vol. 23, pp. 263-285 (1985).

Ofentechnik, Stahl U. Eisen 110, Nr. 6, Jun. 14, 1990 (translation provided).

Grigor'ev, V.S., et al., "Glass for Making Glass Fiber", *Chemical Abstracts,* vol. 81, No. 22, Abstract 140076b (1974).

Howitt et al., "*Cellular Ceramic Diesel Particulate Filter*", Paper No. 810114, SAE Technical Paper Series (1981).

\* cited by examiner

COMPOSITIONS CONTAINING BIOSOLUBLE INORGANIC FIBERS AND MICACEOUS BINDERS

CROSS REFERENCE TO RELATED APPLICATIONS

This application claims priority to U.S. Provisional Application Ser. No. 60/328,646, filed Oct. 9, 2001, the entire disclosure of which is incorporated by reference herein.

FIELD OF THE INVENTION

This invention relates to compositions that can be used, for example, as a fire barrier, as a heat barrier such as an insulating material, or as a protective packing material. More specifically, this invention relates to compositions that include a mixture of biosoluble inorganic fibers and a micaceous binder.

BACKGROUND OF THE INVENTION

Pollution control devices are used on motor vehicles to reduce atmospheric pollution. Two types of devices are currently in widespread use: catalytic converters and diesel particulate filters or traps. Catalytic converters contain one or more catalysts, which are typically coated onto a substrate in the form of a monolithic structure. The monolithic structures are typically ceramic, although metal monoliths have been used. The catalyst(s) oxidize carbon monoxide and hydrocarbons, reduce the oxides of nitrogen in exhaust gases, or a combination thereof. Diesel particulate filters or traps typically are in the form of wall flow filters that have honeycombed monolithic structures made from porous crystalline ceramic materials. In the current state-of-the-art construction of these pollution control devices, the monolithic structure of each type is enclosed within a housing.

A typical monolithic structure generally has relatively thin walls to provide a large amount of surface area. Consequently, the structure is fragile and susceptible to breakage. The typical monolithic structure formed from ceramic material tends to have a coefficient of thermal expansion that is an order of magnitude less than the metal (usually stainless steel) housing in which it might be contained. Protective packing materials such as ceramic mats or paste materials are typically packed between the ceramic monolith and the metal housing to avoid damage to the monolith from road shock and vibration, to compensate for the thermal expansion difference, and to prevent exhaust gases from passing between the monolith and the metal housing. The process of placing or inserting the protective packing material is referred to as "canning" and includes such processes as injecting a paste into a gap between the monolith and the metal housing, or wrapping a sheet material (i.e., mounting mat) around the monolith and inserting the wrapped monolith into the housing.

Typically, the compositions used to form conventional protective packing materials include refractory ceramic fibers that provide properties such as high temperature durability, good handling, resiliency, flexibility, and strength. An intumescent material can also be included that enables the protective packing materials to volumetrically expand at elevated temperatures. Such expansion helps to hold the monolith in place during use. Ceramic sheet materials, ceramic pastes, and intumescent sheet materials useful for mounting the monolith in the housing of a pollution control device are described in, for example, U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), and U.S. Pat. No. 5,242,871 (Hashimoto et al.).

SUMMARY OF THE INVENTION

Compositions are provided that can be used, for example, as a fire barrier, as a protective packing material around the monolithic structure in a fuel cell or in a pollution control device, or as a heat barrier such as an insulating material positioned in the end cone regions of a pollution control device. In particular, the compositions include a micaceous binder and biosoluble inorganic fibers. The compositions can be prepared free of refractory ceramic fibers that are respirable but durable in a physiological medium.

One aspect of the invention provides a composition that includes a micaceous binder in an amount of about 5 to about 80 weight percent and biosoluble inorganic fibers in an amount of about 5 to about 90 weight percent on a dry weight basis. The compositions can also optionally include intumescent materials, non-respirable inorganic fibers, a polymeric binder, a polymeric fiber, or a combination thereof. The compositions can be provided, for example, in the form of a sheet material or in the form of a paste.

Another aspect of the invention provides a pollution control device that includes a housing, a pollution control element disposed in the housing, and a protective packing material that is disposed in a gap between at least a portion of the housing and the pollution control element. The protective packing material, which is typically in the form of a paste or a sheet material, includes a micaceous binder and biosoluble inorganic fibers. The protective packing material can protect the fragile pollution control element from damage due to road shock and vibration, can compensate for thermal expansion differences between the pollution control element and the housing, can prevent exhaust gases from by passing the pollution control element, or a combination thereof.

Yet another aspect of the invention provides a pollution control device that includes a housing and heat barrier (i.e., insulating material) disposed in the housing. The heat barrier includes a micaceous binder and biosoluble inorganic fibers. The heat barrier is typically located in an end cone region of the pollution control device and can be in the form of a sheet material or a paste.

The invention also provides a method of making a sheet material. The method includes forming a slurry that contains a micaceous binder in an amount of about 5 to about 80 weight percent on a dry weight basis and biosoluble inorganic fibers in an amount of about 5 to about 90 weight percent on a dry weight basis, adding a coagulating agent to from a coagulated slurry, and removing water from the coagulated slurry to form a sheet material.

Yet another aspect of the invention provides a method of making a pollution control device that includes a pollution control element, a protective packing material, and a pollution control element. The method includes preparing a protective packing material that contains a micaceous binder and biosoluble inorganic fibers, placing the pollution control element in the housing, and positioning the protective packing material between at least a portion of the housing and the pollution control element. The protective packing material can be in the form of a sheet material or a paste.

Another aspect of the invention provides a sheet material that includes a micaceous binder and biosoluble inorganic fibers. When the sheet material is heated to about 900° C. or to the temperatures typically encountered in a pollution control device, the area of the sheet in the X-Y plane shrinks less than about 6 percent.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention can be more completely understood in consideration of the following detailed description of various embodiments of the invention in connection with the accompanying drawings, in which.

Figure 1:
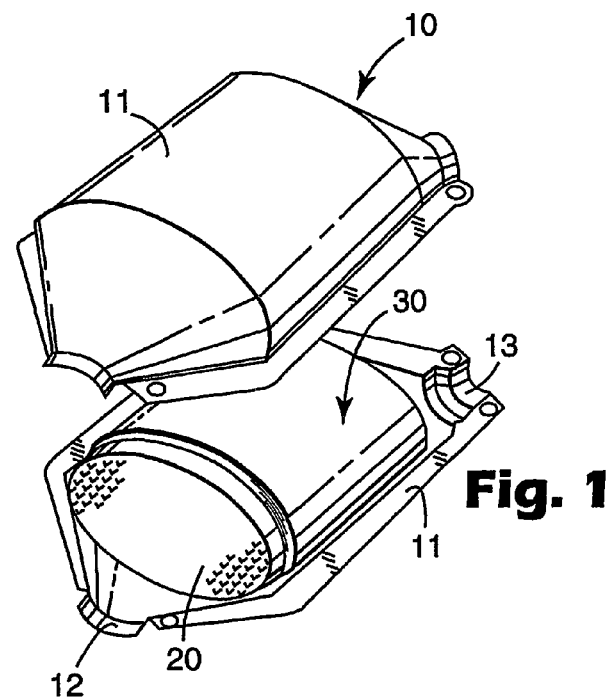
FIG. 1 is a perspective view of a catalytic converter incorporating an embodiment of the present invention and shown in disassembled relation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Compositions are provided that can be used as heat barriers (i.e., insulating materials), as fire barriers, or as protective packing materials. In particular, the compositions include a micaceous binder and biosoluble inorganic fibers. The compositions can be, for example, in the form of a sheet material or a paste. The compositions are typically prepared free of refractory ceramic fibers that are respirable but durable in a physiological medium.

The compositions of the invention can be used as heat barriers, fire barriers, or a combination thereof. For example, the compositions can be placed around pipes, heating devices, or structural elements such as building supports.

In another example, the compositions can be used in pollution control devices as an insulating material. For example, the compositions can be positioned in the inlet or outlet regions (i.e., the end cone regions) of a pollution control device. The compositions can function to insulate the rest of the exhaust system as well as the engine from the temperatures encountered in the pollution control device. When the composition is in the form of a sheet material, the sheet material can be cut and shaped to conform to the shape of the end cone region of the pollution control device. Alternatively, the composition can be placed in a mold having the desired final shape.

The compositions can also be used to provide a protective packing material. For example, the compositions can be used as a protective packing material around the monolithic structure of a fuel cell. In another example, the compositions can be used as a protective material between the fragile monolith structure of the pollution control element and the housing of a pollution control device. That is, the compositions can be disposed in the gap between the monolith of the pollution control element and the housing of pollution control device. The compositions can be, for example, in the form of a paste or sheet material. In one embodiment, the compositions are in the form of a sheet material such as a mounting mat. At least a portion of the monolith pollution control element is wrapped with the sheet material. The wrapped pollution control element is placed in the housing of the pollution control device. In another embodiment, the compositions are in the form of a paste that can be injected into the pollution control device between at least a portion of the fragile monolith structure of the pollution control element and the housing.

An illustrative example of a pollution control device in the form of catalytic converter 10 is shown in FIG. 1. The catalytic converter 10 generally includes a housing 11 surrounding a catalytic converter element 20. The housing 11 has inlet 12 and outlet 13 through which a flow of exhaust gases flows into and out of catalytic converter 10, respectively. The housing 11, which is also referred to as a can or a casing, can be made from suitable materials known in the art for such use. Typically, housing 11 includes one or more metals, metal alloys, and/or intermetallic compositions (hereinafter collectively "metals"). For example, the housing 11 can be stainless steel.

Suitable catalytic converter elements, also referred to as monoliths, are known in the art and include those made of metal, ceramic, or other materials. A variety of ceramic catalytic converter elements are commercially available from a variety of sources. For example, a honeycomb ceramic catalytic converter element is marketed under the trade designation "CELCOR" by Corning Inc., and another is marketed under the trade designation "HONEYCERAM" by NGK Insulated Ltd. Metal catalytic converter elements are commercially available from Behr GmbH and Co. of Germany.

One or more catalyst materials can be coated onto catalytic converter element 20 in accordance with conventional practices. The catalysts used in the catalytic converter element 20 are typically one or more metals (e.g., ruthenium, osmium, rhodium, iridium, nickel, palladium, and platinum) and/or metal oxides (e.g., vanadium pentoxide and titanium dioxide). Most commonly, these catalysts function to oxidize or otherwise eliminate exhaust contaminants such as carbon monoxide and hydrocarbons. Such catalysts also can function to help reduce the amount of oxides of nitrogen in engine exhaust.

To provide a large amount of surface area, embodiments of catalytic converter element 20 generally have very thin walls. The thin walls can cause the catalytic converter element 20 to be fragile and susceptible to breakage. Additionally, in some embodiments, the catalytic converter element 20 can have a coefficient of thermal expansion about an order of magnitude less than that of housing 11. This is particularly the case when housing 11 includes a metal (usually stainless steel) and element 20 is a ceramic. The difference in thermal properties can subject catalytic converter element 20 to a risk of damage with changes in temperature. Mounting mat or sheet material 30, disposed between housing 11 and element 20, helps protect element 20 from damage due to road shock and vibration and/or the thermal expansion difference. Mounting mat or sheet material 30 also helps prevent exhaust gasses from passing between the element 20 and the metal housing 11.

Figure 2:
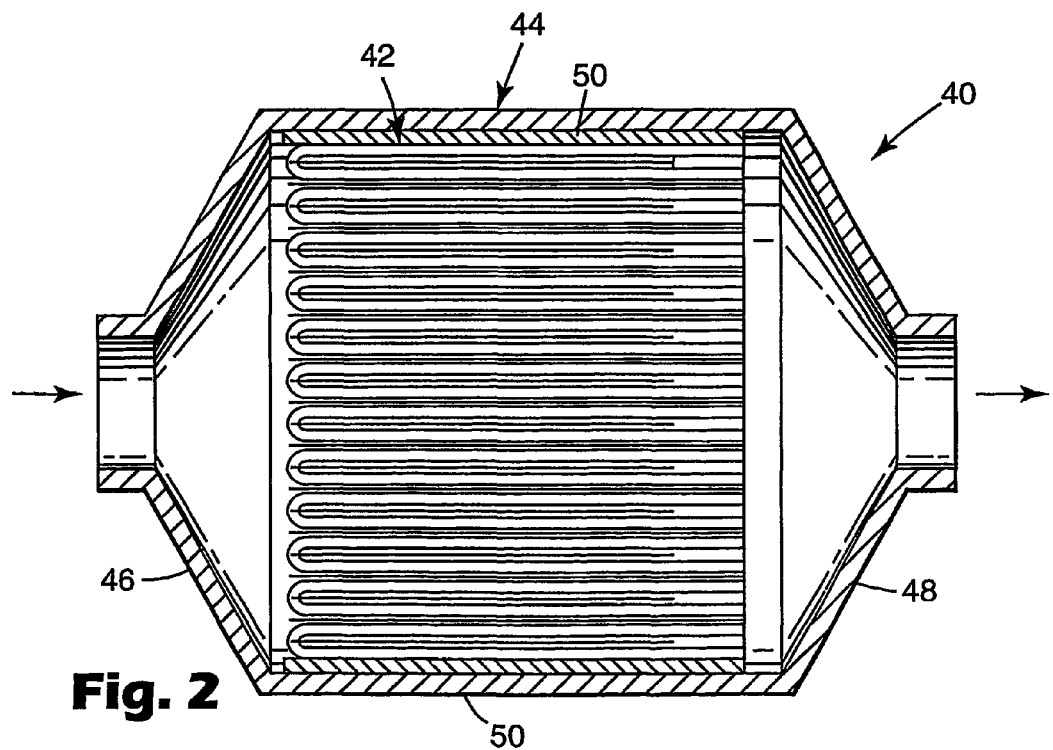
FIG. 2 is a longitudinal central section through a diesel particulate filter incorporating an embodiment of the present invention.

FIG. 2 shows a representative example of a pollution control device in the form of diesel particulate filter 40. The diesel particulate filter or trap 40 is a wall flow filter that includes a honeycombed monolithic structure 42 having a bundle of tubes. Such diesel particulate filter elements are commercially available from a number of sources including, for example, Corning Inc. of Corning, N.Y., and NGK Insulator Ltd. of Nagoya, Japan. Useful diesel particulate filter elements are discussed in "Cellular Ceramic Diesel Particulate Filter," Howitt et al., Paper No. 810114, SAE Technical Paper Series, 1981.

A catalyst may be coated onto the monolithic structure 42 mounted in the diesel particulate filter 40. The diesel particulate filter 40 includes a housing 44 having inlet 46 and outlet 48. Housing 44 surrounds particulate filter element 42 (also referred to as a monolith or monolithic structure). Mounting mat or sheet material 50 is disposed between the filter element 42 and the metal housing 44 and provides the same benefits as mounting sheet 30 of FIG. 1.

Relatively small refractory ceramic fibers, i.e., those having an average diameter of less than about 5 to 6 micrometers and length greater than about 5 micrometers, have been an important component of known mounting mat compositions for pollution control devices. However, fibers in this size range can be respirable and are often durable in physiological fluids, in particular, lung fluids. Thus, protective packing material compositions lacking durable, respirable, refractory ceramic fibers are desired. It has been a significant engineering challenge, however, to make acceptable sheet materials, such as mounting mats for pollution control devices, without the durable, respirable, refractory ceramic fibers.

As used herein, the term "fiber" refers to materials having a length that is greater than the width. In some embodiments, the length is at least 10 times, at least 100 times, or at least 1000 times the diameter.

As used herein, the term "respirable" refers to fibers that can be inhaled by an animal into the lungs of the animal. Typically, respirable fibers have an average diameter less than about 5 micrometers. In some embodiments, respirable fibers have an average diameter less than about 3 micrometers. Conversely, as used herein, the term "non-respirable" refers to fibers that cannot be inhaled by an animal into the lungs of the animal. Typically, non-respirable fibers have an average diameter of at least about 3 micrometers. In some embodiments, non-respirable fibers have an average diameter of at least about 5 micrometers.

One aspect of the invention provides compositions that include biosoluble inorganic fibers in an amount of about 5 to about 90 weight percent on a dry weight basis and micaceous binders in an amount of about 5 to about 80 weight percent on a dry weight basis. The compositions can also optionally include intumescent materials, non-respirable inorganic fibers, polymeric binders, polymeric fibers, or a combination thereof. The composition can be prepared free of refractory ceramic fibers that are respirable but durable in a physiological medium.

In some embodiments, the combination of a micaceous binder and biosoluble inorganic fiber can be substituted for all or a portion of the durable refractory fiber content, both respirable and non-respirable, of conventional sheet materials used in various applications such as pollution control devices. In particular, the combination of biosoluble fibers and micaceous binders can be advantageously substituted for the durable, refractory ceramic fibers that are respirable in size.

As used herein, "biosoluble inorganic oxides fibers" refer to inorganic fibers that are decomposable in a physiological medium or a simulated physiological medium. Physiological medium refers to, but is not limited to, those bodily fluids typically found in the respiratory tract such as, for example, the lungs of animals or humans. As used herein, "durable" refers to inorganic fibers that are not biosoluble.

Biosolubility can be estimated by observing the effects of direct implantation of the inorganic fibers in test animals or by examination of animals or humans that have been exposed to inorganic fibers. Biosolubility can also be estimated by measuring the solubility of the fibers as a function of time in simulated physiological medium such as saline solutions, buffered saline solutions, or the like. One such method of determining solubility is described in U.S. Pat. No. 5,874,375 (Zoitas et al.).

Typically, biosoluble inorganic fibers are soluble or substantially soluble in a physiological medium within about 1 year. As used herein, the term "substantially soluble" refers to inorganic fibers that are at least about 75 weight percent dissolved. In some embodiments, at least about 50 percent of the inorganic fibers are soluble in a physiological medium within about six months. In other embodiments, at least about 50 percent of the fibers are soluble in a physiological fluid within about three months. In still other embodiments, at least about 50 percent of the inorganic fibers are soluble in a physiological fluid within at least about 40 days. For example, the inorganic fibers can be certified by the Fraunhofer Institut as passing the tests for the biopersistence of high temperature insulation fibers in rats after intratracheal instillation (i.e., the fibers have a halftime less than 40 days).

Yet another approach to estimating the biosolubility of inorganic fibers is based on the composition of the inorganic fibers. For example, Germany classifies respirable inorganic oxide fibers based on a carcingenicity index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

The biosoluble inorganic fibers typically include inorganic oxides such as, for example, $Na_2O$, $K_2O$, CaO, MgO, $P_2O_5$, $Li_2O$, and BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of fibers are typically referred to as calcium magnesium silicate fibers. The calcium magnesium silicate fibers usually contain less than about 10 weight percent aluminum oxide. In some embodiments, the fibers include from about 45 to about 90 weight percent $SiO_2$, up to about 45 weight percent CaO, up to about 35 weight percent MgO, and less than about 10 weight percent $Al_2O_3$. For example, the fibers can contain about 55 to about 75 weight percent $SiO_2$, about 25 to about 45 weight percent CaO, about 1 to about 10 weight percent MgO, and less than about 5 weight percent $Al_2O_3$.

Suitable biosoluble inorganic oxides fibers are described in U.S. Pat. Nos. 5,332,699 (Olds et al.); 5,585,312 (TenEyck et al.); 5,714,421 (Olds et al.); 5,874,375 (Zoitas et al.); and European Patent 1 388 649 A1. Various methods can be used to form biosoluble inorganic fibers including, but not limited to, sol gel formation, crystal growing processes, and melt forming techniques such as spinning or blowing.

Biosoluble fibers are commercially available from Unifrax Corporation (Niagara Falls, N.Y.) under the trade designation "INSULFRAX". Other biosoluble fibers are sold by Thermal Ceramics (located in Augusta, Ga.) under the trade designation "SUPERWOOL." For example, SUPERWOOL 607 contains 60 to 70 weight percent $SiO_2$, 25 to 35 weight percent CaO, 4 to 7 weight percent MgO, and a trace amount of $Al_2O_3$. SUPERWOOL 607 MAX can be used at a slightly higher temperature and contains 60 to 70 weight percent $SiO_2$, 16 to 22 weight percent CaO, 12 to 19 weight percent MgO, and a trace amount of $Al_2O_3$.

Suitable biosoluble inorganic fibers can have a wide range of average diameters and average lengths. Biosoluble inorganic fibers are commercially available that have an average fiber diameter in the range of about 0.05 micrometers to about 15 micrometers. In some embodiments, the biosoluble inorganic fibers have average fiber diameters in the range of about 0.1 micrometers to about 5 micrometers. As the average diameter of the biosoluble inorganic fibers decreases, an increased amount of the fiber can be incorporated into a given volume of the sheet material resulting in better entrapment of the micaceous binder. Sheet materials prepared having a higher density of fibers tend to have better resiliency and flexibility.

The biosoluble inorganic fibers typically have an average fiber length in the range of about 0.1 centimeters to about 3 centimeters. Generally, the length of the biosoluble inorganic fibers is not critical as any selected fiber(s) can be broken down into smaller lengths during the manufacturing process, if desired.

As used herein, the phrase "micaceous mineral" refers to a family of minerals that can be split or otherwise separated into planar sheets or platelets. Micaceous minerals include, but are not limited to, expanded vermiculite, unexpanded vermiculite, and mica Micaceous minerals typically have an average aspect ratio (i.e., the length of a particle divided by its thickness) that is greater than about 3.

As used herein, "micaceous binder" refers to one or more micaceous minerals that can be wetted and then dried to form a cohesive body that is self-supporting. As used herein, "self-supporting" refers to a micaceous binder that can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

Micaceous binders include micaceous minerals that typically have a particle size less than about 150 micrometers (e.g., the micaceous binder contains micaceous minerals that can pass through a 100 mesh screen). In some embodiments, the micaceous binder contains micaceous minerals having a size less than about 150 micrometers and having an average aspect ratio of greater than about 8 or greater than about 10.

Suitable micaceous binders can include micaceous minerals that have been crushed. As used herein, "crushed" refers to micaceous minerals that have been processed in any suitable manner that reduces the average particle size. Methods of crushing include, but are not limited to, mechanical shearing of a dilute or concentrated slurry, milling, air impact, and rolling.

Other methods can be used alone or in combination with crushing to reduce the particle size. For example, thermal or chemical methods can be used to expand or expand plus exfoliate the micaceous minerals. Expanded vermiculite can be sheared or otherwise processed in water to produce an aqueous dispersion of delaminated vermiculite particles or platelets. Shearing can be adequately performed, for example, using a high shear mixer such as a blender.

The micaceous binder can be non-intumescent, intumescent, or a combination thereof. As used herein, "non-intumescent" refers to material that exhibits less than about 10 percent free expansion in thickness when heated to temperatures of about 800° C. to about 900° C. Free expansion refers to the amount of expansion in the Z-axis that the material undergoes when heated without constraints. As used herein, "intumescent" refers to a material that can exhibit at least about 10 percent free expansion in thickness under the same conditions.

In some embodiments, the micaceous binder includes processed vermiculites (i.e., vermiculate that has been expanded, delaminated, and crushed). Processed vermiculite is typically non-intumescent. In other embodiments, the micaceous binder includes vermiculite that has not been expanded and delaminated or that has been only partially expanded and delaminated. Such materials tend to be intumescent.

Suitable micaceous binders are commercially available from W. R. Grace & Company, and include a delaminated vermiculite powder (under the trade designation "VFPS") and an aqueous dispersion of chemically exfoliated vermiculite (under the trade designation "MICROLITE). Also, expanded vermiculite flakes are available from W. R. Grace and Company (under the trade designation "ZONELITE #5") that can be reduced in particle size to form a micaceous binder.

In some embodiments, the compositions of the invention are in the form of a sheet material. Biosoluble inorganic fibers by themselves are not a practical substitute for durable, refractory ceramic fibers used in conventional sheet materials. For example, biosoluble inorganic fibers tend to exhibit excessive shrinkage when subjected to the temperature extremes encountered during use of a typical pollution control device. Excessive mounting mat or sheet material shrinkage could result in the fragile monolith pollution control element being loosely held inside the housing of the pollution control device. A loosely held monolith structure can be easily damaged, for example, from a physical shock.

Sheet materials (i.e., mounting mats) prepared by direct substitution of the durable, refractory ceramic fibers in conventional mounting mats with biosoluble inorganic fibers may have adequate initial, cold holding performance (i.e., such mounting mats can hold a pollution control element in a metal housing at room temperature prior to experiencing an elevated temperature). However, such sheet materials tend to shrink and thereby fail to retain the desired holding capabilities when heated to the actual use temperatures.

The present invention provides a sheet material that includes a micaceous binder and biosoluble inorganic fibers. The sheet materials of the present invention typically shrink less than about 6 percent upon heating to about 900° C. or the temperatures typically encountered during use of a pollution control device. Surprisingly, the shrinkage problem burdening biosoluble inorganic fibers can be substantially avoided when biosoluble inorganic fibers and micaceous binder are used in combination.

Sheet materials containing the combination of micaceous binder and biosoluble inorganic fibers can be used at operating temperatures well above temperature suitable for a sheet material containing biosoluble inorganic fibers without the micaceous binder. The sheet materials can typically be used at temperatures up to about 800° C. In some embodiments, the sheet material can be used at temperatures up to about 850° C., up to about 900° C., or up to about 950° C.

The amount of biosoluble inorganic fiber and micaceous binder included in the sheet materials of the invention can vary within a wide range. The biosoluble inorganic fibers are typically present in an amount to ensure that the resultant mounting mat or sheet material has the desired degree of flexibility and handling characteristics. Flexible sheet materials facilitate wrapping the sheet material around a pollution control element during the canning process. However, if too much biosoluble inorganic fiber is used, the mounting mat or sheet material may shrink more than is desired upon heating.

Balancing these concerns, the compositions of the invention typically contain up to about 90 weight percent of the biosoluble inorganic fibers on a dry weight basis. In some embodiment, the compositions include up to about 85 percent, up to about 80 percent, up to about 60 weight percent, up to about 40 weight percent, or up to about 30 weight percent of the biosoluble fibers on a dry weight basis.

The dry weight of the composition refers to the weight of the solids in the composition. Thus, when the composition is in the form of a sheet material, the dry weight refers to the final weight after drying the sheet material to remove all water and solvents. When the composition is in the form of a slurry or paste, the dry weight is the total weight minus the weight of water and any other solvents. That is, the dry basis weight includes the weight of the biosoluble fibers, the micaceous binder, and other solids such as the solids from polymeric binder, polymeric fiber, intumescent materials, non-respirable inorganic fibers, etc. The dry basis weight typically does not include other materials that can result in some solids in miniscule amounts (e.g., less than about 0.5 weight percent of the dry basis weight of the mat) such as defoaming agents, coagulating agents, and surfactants. Large portions of these materials tend to remain in solution and are drained with the water during the process of making the sheet materials.

The compositions typically includes at least about 5 weight percent biosoluble inorganic fibers on a dry weight basis. In some embodiments, the compositions includes at least about 10 weight percent or at least about 15 weight percent of the biosoluble inorganic fibers on a dry weight basis.

The biosoluble inorganic fibers are typically included in the composition in an amount in the range of about 5 to about 90 weight percent, in the range of about 5 to about 85 weight percent, in the range of about 5 to about 80 weight percent, in the range of about 10 to about 60 weight percent, in the range of about 15 to about 40 weight percent, or in the range of about 15 to about 30 weight percent on a dry weight basis.

The compositions typically include up to about 80 weight percent micaceous binder on a dry weight basis. In some embodiments, the compositions include up to about 60 percent, up to about 50 percent, or up to about 45 weight percent of the micaceous binder on a dry weight basis.

The compositions typically include at least about 5 weight percent micaceous binder based on the total dry weight of the composition. In some embodiments, the composition includes at least about 10 weight percent, or at least about 15 weight percent micaceous binder on a dry weight basis.

The micaceous binder is typically present in the composition in an amount in the range of about 5 to about 80 weigh percent, in the range of about 10 to about 60 weight percent, in the range of about 15 to about 50 weight percent, or in the range of about 15 to about 45 weight percent on a dry weight basis.

When sheet materials are formed from the compositions described above using expanded, delaminated, and crushed vermiculite, the resultant sheet materials are substantially non-intumescent. Using unexpanded vermiculite dust can result in a greater amount of free expansion along the Z-axis, depending upon the amount of unexpanded vermiculite used. Whether prepared using a non-intumescent or an intumescent micaceous binder, the sheet materials typically exhibit shrinkage of less than about 6 percent in the X-Y plane of the sheet. In some embodiments, the shrinkage in the X-Y plane is less than about 5 percent. A formula for determining shrinkage is provided below.

The compositions can optionally include non-respirable inorganic fibers. The non-respirable fibers can be biosoluble or can be durable. Non-respirable inorganic fibers that are durable can include, for example, ceramic materials such as ceramic oxides, ceramic nitrides, glass materials, or a combination thereof. The term "glass", as used herein, refers to an amorphous, inorganic material such as an oxide having a diffuse x-ray diffraction pattern at least substantially without definite lines or other indicia of a crystalline phase.

If the fibers are longer than desired when obtained from a desired source, the fibers can be chopped, cut, or otherwise processed to reduce the fiber length to a desired length. The fibers typically have an average length in the range of about 0.1 cm to about 1 cm.

The amount of non-respirable inorganic fiber incorporated into the composition can vary over a wide range. As a general guideline, compositions of the present invention can include up to about 15 weight percent non-respirable inorganic fibers on a dry weight basis. In some embodiments, the compositions contains up to about 10 weight percent, up to about 5 weight percent, or up to about 3 weight percent of the non-respirable inorganic fibers on a dry weight basis.

The compositions of the present invention can also include intumescent, inorganic materials having an average particle size greater than about 300 micrometers. In some embodiments, the intumescent material is micaceous and has a particle size greater than 150 micrometers (i.e., the particles do not pass through a 100 mesh screen). That is, when the intumescent material is micaceous, any particles smaller than about 150 micrometers are considered a micaceous binder.

A composition containing an intumescent material can expand when heated and can typically exert sufficient pressure between a pollution control element and the housing of the pollution control device to form a supportive, protective seal. In some embodiments, such a composition can remain resiliently compressible such that the pollution control element is cushioned against physical shocks.

Examples of suitable intumescent, inorganic materials having an average particle size greater than about 300 micrometers include unexpanded vermiculite, vermiculite ore, hydrobiotite, water swellable synthetic tetrasilicic fluorine type mica described in U.S. Pat. No. 3,001,571 (Hatch), alkali metal silicate granules as described in U.S. Pat. No. 4,521,333 (Graham et al.), expandable graphite, combinations of these, and the like. Other suitable intumescent materials include, for example, granules sold by 3M (St. Paul, Minn.) under the trade designation "EXPANTROL 4BW". Some of these intumescent materials can exhibit more than 10 percent free expansion in thickness when heated to temperatures above about 200° C. or about 300° C. Additionally, some of these intumescent materials can exhibit more than about 50 percent free expansion when heated.

The amount of intumescent material having an average particle size greater than about 300 micrometers included in the compositions can vary over a wide range. If too little intumescent material is present, the composition may expand less than desired. For example, when such a composition is in the form of a mounting mat in a pollution control device, the mounting mat may not support the monolith adequately during use. On the other hand, if too much intumescent material is used, the composition may expand too much when heated. For example, when the composition is in the form of a mounting mat, the pressure against the pollution control element may to be too high, perhaps damaging the pollution control element.

Balancing these concerns, compositions generally include up to about 80 weight percent, up to about 70 weight percent, or up to about 60 weight percent intumescent material having an average particle size greater than about 300 micrometers. In some embodiments, the compositions includes about 10 to about 80 weight percent, about 20 to about 70 weight percent, about 30 to about 60 weight percent, or about 40 to about 60 weight percent of the intumescent material having an average particle size greater than about 300 micrometers. The weight percent is based on the dry weight of the composition.

For example, the composition can include micaceous binder in an amount of about 5 to about 80 weight percent on a dry weight basis, biosoluble inorganic fibers in an amount of about 5 to about 80 weight percent on a dry weight basis, and intumescent material in an amount of about 10 to about 80 weight percent on a dry weight basis. The micaceous binder can include vermiculite having a particle size less than about 150 micrometers and the intumescent material can include vermiculite having a particle size greater than about 150 micrometers (none passes through a 100 mesh screen). The intumescent vermiculite can have an average particle size that is greater than about 300 micrometers.

Compositions of the present invention can also include one or more polymeric binders. The polymeric binder can be used to provide added resiliency and flexibility during formation and during handling of the compositions. For example, when the composition is in the form of sheet material such as a mounting mat for a pollution control device, the mounting mat can be wrapped more easily around the pollution control element. The operating temperatures typically encountered in such a device can break down (e.g., decompose or eliminate) the polymeric constituents. Thus, in some embodiments, the organic constituents can be transient, rather than permanent, components of the compositions.

Suitable polymeric binders can be thermoplastic or thermoset and can be provided as a 100 percent solids composition, a solution, a dispersion, a latex, an emulsion, combinations of these, and the like. In some embodiments, the polymeric binder is an elastomer. Suitable polymers include, but are not limited to, natural rubber, copolymers of two or more copolymerizable species including styrene and butadiene, copolymers of two or more copolymerizable species including butadiene and acrylonitrile, (meth)acrylate polymers and copolymers, polyurethanes, polyesters, polyamides, cellulosic polymers, other elastomer polymers, or combinations of these.

The compositions can include about 0.1 to about 15 weight percent, about 0.5 to about 12 weight percent, or about 1 to about 10 weight percent of the polymeric binder on a dry weight basis.

In some embodiments, the polymer binders are acrylic- and/or methacrylate-containing latex compositions. Such latex compositions tend to burn cleanly without producing undesirable amounts of toxic or corrosive by-products. Examples of suitable acrylic emulsions include those commercially available under the trade designations "RHOPLEX HA-8" (a 44.5% by weight solids aqueous emulsion of acrylic copolymers) from Rohm and Haas of Philadelphia, Pa. and under the trade designation "AIRFLEX 600BP" (a 55% solids ethylene vinyl acetate copolymer) from Air Products of Allentown, Pa.

Polymeric fibers optionally can be included in the compositions to improve the handling, flexibility, the resiliency, or a combination thereof. When the compositions are in the form of a sheet material, polymeric fibers tend to enhance processing and improve the wet strength of the sheet material. As with the polymeric binder, polymeric fibers tend to burn out (i.e., to decompose or be eliminated) after one or more heating cycles if the compositions are used in a pollution control device.

The polymer fibers can be formed from any of the polymers listed above with respect to the polymeric binder. The compositions can include up to about 5 weight percent polymeric fibers on a dry weight basis. In some embodiments, the compositions includes up to about 2 or up to about 1 weight percent polymeric fiber. For example, the compositions can include about 0.1 to about 2 weight percent or about 0.2 to about 1.0 weight percent of polymeric fibers on a dry weight basis. The polymeric fibers may be staple fibers or fibrillated fibers. In one embodiment, the polymeric fibers are staple fibers in the range of about 0.5 to about 5 denier.

The compositions can also include other materials in accordance with conventional practices. Such materials include, for example, plasticizers, wetting agents, defoaming agents, latex coagulants, clays, lightweight fillers, refractory fillers, metallic fibers, or combinations of these.

In some embodiments, the compositions are in the form of sheet materials and the sheet materials include an edge protector to minimize erosion to the edges of the sheet material. Such erosion can be caused, for example, by the exhaust gas when the sheet material is used in a pollution control device. Suitable edge protectors can include, for example, a metal mesh placed on the edges of the sheet or a mixture of a binder and glass as disclosed in U.S. Pat. No. 6,245,301 (Stroom et al.). Other edge protectors know in the art can be used.

In one embodiment of the present invention, the composition includes about 5 to about 90 weight percent biosoluble inorganic fibers and about 5 to about 80 weight percent micaceous binder on a dry weight basis. For example, the composition can include about 5 to about 80 weight percent micaceous binder and about 5 to about 85 weight percent biosoluble inorganic fibers or about 5 to about 80 weight percent biosoluble inorganic fibers and about 5 to about 80 weight percent biosoluble inorganic fibers.

In other examples, the composition can include about 10 to about 60 weight percent micaceous binder and about 10 to about 60 weight percent biosoluble fibers or about 15 to about 50 weight percent micaceous binder and about 15 to about 40 weight percent biosoluble fibers on a dry weight basis. As yet another example, the composition can include about 15 to about 45 weight percent micaceous binder and about 15 to about 30 weight percent biosoluble fibers on a dry weight basis.

In another embodiment of the present invention, the composition includes, on a dry weight basis, about 5 to about 80 weight percent biosoluble inorganic fibers, about 5 to about 80 weight percent micaceous binder, and about 10 to about 80 weight percent intumescent material having an average particle size greater than about 300 micrometers. For example, the composition can include, on a dry weight basis, about 10 to about 60 weight percent micaceous binder, about 10 to about 60 weight percent biosoluble fibers, and about 20 to about 70 weight percent intumescent material having an average particle size greater than about 300 micrometers.

As another example of this embodiment, the composition can include, on a dry weight basis, about 15 to about 50 weight percent micaceous binder, about 15 to about 40 weight percent biosoluble fibers, and about 30 to about 60 weight percent intumescent material having an average particle size greater than about 300 micrometers. As yet another example, the composition can include, on a dry weight basis, about 15 to about 45 weight percent micaceous binder, about 15 to about 30 weight percent biosoluble fibers, and about 40 to about 60 weight percent intumescent material having an average particle size greater than about 300 micrometers.

In another embodiment, the composition includes about 5 to about 80 weight percent biosoluble inorganic fibers, about 5 to about 80 weight percent micaceous binder, about 10 to about 80 weight percent intumescent material having an average particle size greater than about 300 micrometers, and up to about 15 weight percent polymeric binder on a dry weight basis.

For example, the composition according to this embodiment can include about 15 to about 50 weight percent micaceous binder, about 15 to about 40 weight percent biosoluble fibers, about 40 to about 60 weight percent intumescent material having an average particle size greater than about 300 micrometers, and about 0.5 to about 12 weight percent polymeric binder on a dry weight basis.

In yet another embodiment, the composition can include about 5 to about 80 weight percent biosoluble inorganic fibers, about 5 to about 80 weight percent micaceous binder, about 10 to about 80 weight percent intumescent material having an average particle size greater than about 300 micrometers, up to about 15 weight percent polymeric binder, and up to about to about 5 weight percent polymeric fibers on a dry weight basis.

For example, the composition according to this embodiment can include about 15 to about 50 weight percent micaceous binder, about 15 to about 40 weight percent biosoluble fibers, about 40 to about 60 weight percent intumescent material having an average particle size greater than about 300 micrometers, about 0.5 to about 12 weight percent polymeric binder, and up to about 2 weight percent polymeric fiber on a dry weight basis.

Sheet materials prepared from the compositions of the present invention can have a single layered or multilayered construction. In one embodiment, the sheet material can include a first layer having biosoluble inorganic fibers and a micaceous binder and at least one additional layer provided on this first layer. A representative embodiment of such an additional layer can include, but is not limited to, ingredients such as glass fibers as disclosed in U.S. Pat. No. 5,290,522 (Rogers et al.), shot free ceramic fibers as disclosed in U.S. Pat. No. 4,929,429 (Merry), an intumescent material, or a combination thereof.

For example, the multilayered sheet material can include a first layer that contains biosoluble inorganic fiber and a micaceous binder and a second layer that contains fibers capable of withstanding high temperatures. Fibers capable of withstanding high temperatures include, but are not limited to, fibers sold under the trade designation "SAFFIL" by Saffil Limited (Pilington, U.K) and fibers sold under the trade designation "NEXTEL" by 3M (St. Paul, Minn.).

The multilayered sheet material can be formed using any of a variety of conventional fabrication techniques. One representative fabrication approach involves forming individual layers and then laminating the layers together using an adhesive. Multilayer sheet material can also be formed as described in U.S. Pat. No. 5,853,675 (Howorth). Alternatively, the layers can be formed one on top of the other as described in U.S. Pat. No. 6,051,193 (Langer et al.).

The sheet materials prepared from the compositions of the present invention can be formed using any of a variety of suitable techniques such as, for example, a papermaking process. In one embodiment of a papermaking approach, a micaceous binder is prepared by adding expanded micaceous mineral(s) to water. The concentration and temperature can both vary over a wide range. In some embodiments, warm water, such as water at a temperature of about 30° C. to about 75° C., can be used to prepare the slurry. For example, the water can be at a temperature of about 35° C. to about 45° C. The mineral is delaminated (i.e., exfoliated) and crushed to a particle size suitable for a binder (i.e., less than about 150 micrometers).

A dilute slurry can be prepared by adding water to the micaceous binder. Biosoluble inorganic fibers and optionally other inorganic and polymeric fiber constituents can be added to the slurry. Any amount of shear that disperses the micaceous binder and biosoluble fibers can be used. In some embodiments, low to moderate shear for a relatively brief time, e.g., 1 second to 10 minutes or about 3 to 80 seconds, can be used to disperse the fibers. The slurry can be mixed at moderate speed to keep the solid ingredients suspended. Other ingredients such as a defoaming agent and polymeric binders can be added.

A suitable coagulating agent such as an acidifying agent can be added. Other coagulating agents, such as one that can cause coagulation via basic means, can also be used in accordance with conventional practices. During coagulation, larger particles of the polymeric binder typically formed. The fines and other particulate matter tend to be bound to the polymeric binder and trapped in the fiber matrix. That is, the fines do not cause clogging of screens used for filtering. Binding the fines to the fiber matrix facilities draining the water from the slurry and can decrease the processing time needed to prepare sheet material.

The optional intumescent material having an average particle size greater than about 300 micrometers is typically added after coagulation. This particular order of addition can also facilitate dispersing the solids in the slurry and removing the water from the slurry. However, the order of addition is not critical and other orders of addition are acceptable.

The resultant slurry composition can be cast onto a suitable screen, drained, and pressed. Alternatively, the plies can be formed by vacuum casting the slurry onto a wire mesh or screen. The resultant pressed sheet material can be dried in any suitable manner, e.g., air dried or oven dried. For a more detailed description of the standard paper making techniques employed, see U.S. Pat. No. 3,458,329 (Owens et al.).

The sheet material can be cut into a desired shape such as a shape suitable for use as a mounting mat or for use as a heat barrier (i.e., insulating material) in the end-cone region of a pollution control device. Cutting can be accomplished, for example, by using a die stamping process. The sheet materials prepared from the compositions of the invention can be reproducibly cut to satisfy stringent size tolerances. The sheet materials can exhibit suitable handling properties and are not so brittle as to crumble in one's hand. For example, the sheet materials can be easily and flexibly fitted around a pollution control element without breaking apart to form a resilient, protective, supportive seal in a pollution control device.

The compositions of the invention can also be prepared in the form of a paste. To prepare a paste, the total solids are typically higher than about 30 percent. In some embodiments, the solids are about 30 to about 60 percent. The paste typically has a consistency and viscosity that can be injected, for example, into the gap between a pollution control element and the housing of a pollution control device. U.S. Pat. No. 5,736,109 (Howorth), describes a suitable process for making a paste. A paste can also be formed by initially forming a slurry and then removing some of the water to increase the percent solids. Further, the paste can be used to form a sheet material.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

EXAMPLES

The following tests were used to characterize the sheet material included in the examples and comparative examples.
Elevated Temperature Shrinkage This test was used to determine the shrinkage of sheet material at temperatures that may be seen in a pollution control device. A sample was cut from a sheet using a square die having dimensions of 4.44 cm by 4.44 cm. The sample was measured in the X-Y plane using a dial caliper gauge to determine the area ($A_{before\ heating}$), and then placed in a Thermalyne Type 48000 furnace that had been pre-heated to 900° C. The sample was heated for 24 hours, 48 hours, or 72 hours as indicated in the test results. After removal from the furnace, the sample was cooled to room temperature and measured with the caliper gauge to determine the area after heating ($A_{after\ heating}$). The percent shrinkage (% Shrinkage) was determined as follows.

$$\% \text{ Shrinkage} = [(A_{before\ heating} - A_{after\ heating})/A_{before\ heating}] \times 100$$

The sheet material may expand in the Z-axis as a consequence of heating, but this kind of expansion was disregarded in determining percent shrinkage per the above formula. The shrinkage of sheet materials of the present invention is typically less than about 6 percent. Typical mounting mats used in the industry have shrinkage of about 4 percent to about 5 percent.
Real Condition Fixture Test (RCFT)

This test was used to measure the pressure exerted by the sheet material under conditions representative of actual conditions found in a pollution control element such as a catalytic converter during normal use. Details are further described in U.S. Pat. No. 5,869,010.

A sheet material sample having dimensions of 4.44 cm by 4.44 cm was placed between two 50.8 mm by 50.8 mm heated, metal platens having independent heating controls. Each platen was heated incrementally to a different temperature profile to simulate the temperatures of the metal housing and the monolith in a catalytic converter. During heating, the gap between the platens was increased by a value calculated from the temperatures and thermal expansion coefficients of a typical catalytic converter housing and monolith. After heating to the maximum temperature, the platens were cooled incrementally and the gap was decreased by a value calculated from the temperatures and thermal expansion coefficients.

The materials are initially compressed to a selected density to simulate protective packing material in a pollution control device. This initial density, typically ranging from about 0.80 to about 1.0 g/cc, is referred to as the mount density.

The force exerted by the mounting material was measured using a Sintech ID computer controlled load frame with an Extensiometer (available from MTS Systems Corp., Research Triangle Park, N.C. The pressure exerted by the mat during the heating and cooling cycle was plotted against the temperature profile. The sample and platens were cooled to room temperature, and the cycle was repeated two more times to produce a graph having 3 plots of pressure vs. temperature. A minimum value of at least 50 kiloPascals (kPa) for each of the three cycles is typically considered desirable. However, if a lower pressure was observed at some point on a plot, the mat may still be suitable.

Examples 1-3 and Comparative Example C1

Sheet materials were prepared by adding 1500 ml of tap water at 40° C. and expanded vermiculite (ZONELITE Expanded Vermiculite #5 obtained from W. R. Grace, Cambridge, Mass.) to a Waring blender. The blender was run on the low setting for 3 minutes to delaminate and crush the vermiculite. Then Fraunhofer certified biosoluble inorganic fibers (SUPERWOOL 607 available from Thermal Ceramics, Augusta, Ga.) were added and blended on low for 3 seconds. The amounts of expanded vermiculite and biosoluble inorganic fibers totaled 25 grams and specifics are shown in Table 1.

The blender contents were poured into a stainless steel container and 2000 ml of water at 40° C. were used to rinse out the blender and the contents were added to the stainless steel container. The contents of the container and 3 drops of a defoamer (FOAMMASTER III available from Henkel) were mixed using a propeller mixer at medium speed to keep the solids suspended. A 55 percent solids ethylene vinyl acetate copolymer latex (AIRFLEX 600BP available from Air Products Polymers Allentown, Pa.) was added in the amounts shown and mixed for 1 minute. Then 20 grams of a 25 percent solids solution of aluminum sulfate (Aluminum Sulfate Solution available from Koch Sulphur Products of Pinebend, Minn.) were added to coagulate the latex.

The resulting slurry was poured into a handsheet former and drained. The resulting sheet was covered with blotting paper. After rolling with a rolling pin 3 times, the sheet was placed between blotting papers and pressed for 5 minutes and 552 kiloPascals, and then dried for 15 minutes in a convection oven set at 150° C. The sheet was conditioned at room temperature (approximately 22° C.) and tested for shrinkage according to the above procedure.

Comparative Example C1 was prepared in the same manner except that no expanded vermiculite was used.

TABLE 1

|  | Ex 1 | Ex 2 | Ex 3 | Ex C1 |
| --- | --- | --- | --- | --- |
| Expanded vermiculite-grams | 20.9 | 4.0 | 12.5 | 0 |
| Soluble Fibers-grams | 4.1 | 21.0 | 12.5 | 25 |
| Latex-grams | 6.0 | 7.0 | 7.4 | 7.1 |
| Dry mat composition |  |  |  |  |
| Expanded vermiculite-% | 74 | 13.8 | 43 | 0 |
| Soluble Fibers-% | 14.4 | 72.7 | 43 | 86.5 |
| Latex-% | 11.7 | 13.5 | 14 | 13.5 |
| % Shrinkage | 0.2 | 2.0 | 1.9 | 7.0 |

The data in Table 1 show that sheet materials of the invention exhibit significantly less shrinkage that compositions having only soluble fibers.

Example 4 and Comparative Examples C2-C3

An intumescent mat composition was prepared using the procedure described for Example 1 and the compositions shown in Table 2. The biosoluble inorganic fibers were blended for about 5 seconds before adding the latex, and 10 parts of a 50 percent solids solution of aluminum sulfate were added to coagulate the latex. The unexpanded vermiculite was vermiculite ore obtained from Cometals, Inc. New York, N.Y. and had a mesh size less than 18 mesh (less than about 1 mm in size). The unexpanded vermiculite was added after coagulating the latex and mixed to form a fairly uniform dispersion.

Example C2 was prepared as Example 4 except without expanded vermiculite.

The sheet materials were tested for shrinkage after heating at 900° C. for 25 hours and 72 hours. The results are shown in Table 2.

TABLE 2

|  | Ex 4 Composition | | Ex C2 Composition | |
| --- | --- | --- | --- | --- |
|  | Wet-grams | Dry-% | Wet-grams | Dry-% |
| Expanded vermiculite | 25 | 22 | 0 | 0 |
| Soluble Fibers | 25 | 22 | 50 | 44 |
| Unexpanded vermiculite | 55 | 49 | 55 | 49 |
| Latex | 15 | 7 | 15 | 7 |
| % Shrinkage after 24 hrs | | 0.7 | | 10.8 |
| % Shrinkage after 72 hrs | | 3.9 | | 16.3 |

The data in Table 2 show that an intumescent sheet materials of the invention shrinks considerably less than a mat of the same composition without the expanded, delaminated, and crushed vermiculite binder.

Figure 3:
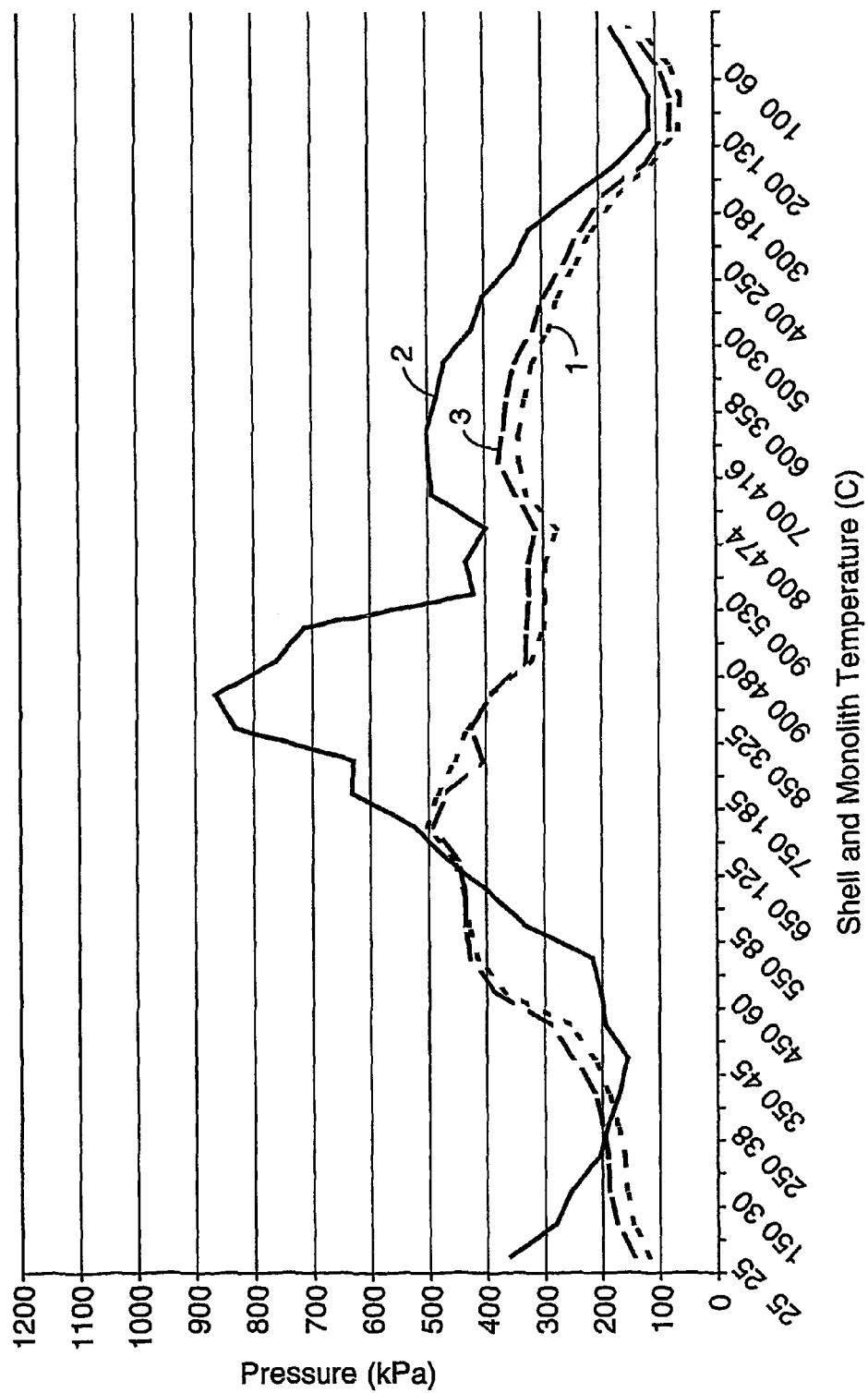
FIG. 3 is a plot of pressure versus temperature data obtained from a Real Condition Fixture Test of a sheet material embodiment of the present invention.

Example 4 was then tested in the real condition fixture test (RCFT). The mount density was 0.90 g/cc. The sample was held at peak temperature for 2 hours. The are shown in FIG. 3. The first cycle is shown in plot 2, the second cycle is shown in plot 3, and the third cycle is shown in plot 1. The pressure was above 50 kPa during all three cycles at all temperatures, indicating that the mat is suitable for use in a catalytic converter.

Example 5

Figure 4:
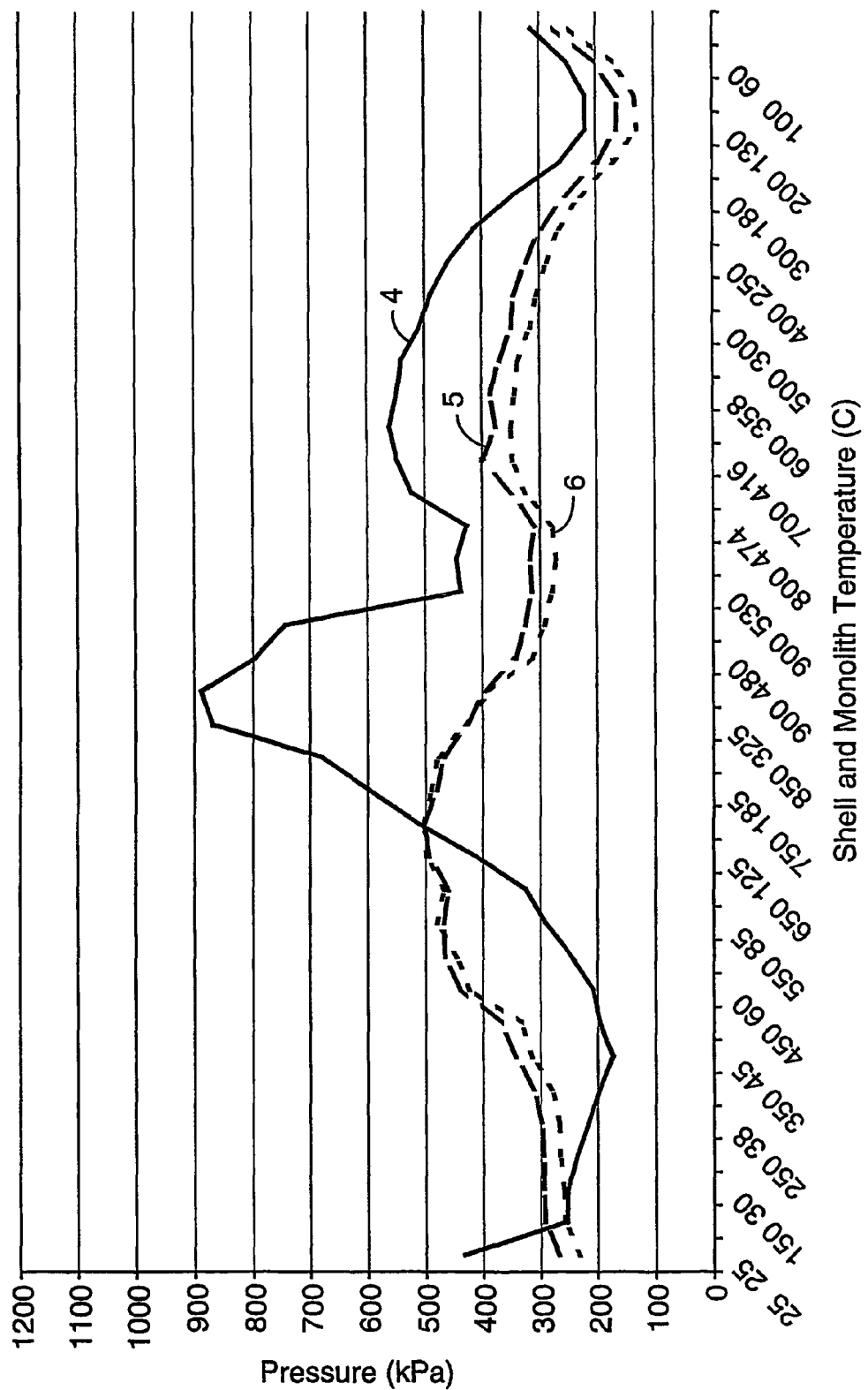
FIG. 4 is a plot of pressure versus temperature data obtained from a Real Condition Fixture Test of another sheet material embodiment of the present invention.

A sheet material was prepared as in Example 4 except that the expanded vermiculite was Micron Grade Expanded Vermiculite obtained from The Strong Co., Inc., Pine Bluff, Arfk., and 1 gram of 0.635 long rayon fibers (available from Minifibers Inc Johnson City, Tenn.) was added to the slurry with the soluble fibers. A graph of the results is shown in FIG. 4. The mount density was 0.95 g/cc. The sample was held at the peak temperature for 2 hours. The first cycle is shown in plot 4, the second cycle is shown in plot 5, and the third cycle is shown in plot 6. The intumescent mat had acceptable shrinkage and pressures above 100 kPa when tested in the RCFT.

Example 6

A multilayered construction was formed from a layer of dry-laid and needle punched sheet made as described in U.S. Pat. No. 5,290,522 (Rogers, et al.) at about 700 grams per square meter and a layer of intumescent sheet of Example 5 at about 2770 grams per square meter. The two layers were placed together, and the construction was tested in the RCFT (real condition fixture test) with the Example 5 layer placed next to the hot side platen and the dry-laid sheet placed next to the cold side platen. When tested for three temperature cycles as described in Example 5 at a mount density of about 0.7 grams per cubic centimeter but with the maximum platen temperature reaching only 500° C. on the hot platen and 200° C. on the cold platen, a minimum pressure of about 75 kilopascals and a maximum pressure of about 220 kilopascals was observed. These results demonstrate the general utility of using layered constructions of the present invention as mounting systems in a variety of applications.

Example 7

A sample was prepared containing unexpanded vermiculite as the micaceous binder. The sheet material was prepared using 45 weight percent unexpanded vermiculite, 45 weight percent SUPERWOOL 607, and 15 weight percent AIRFLEX 600BP latex.

The unexpanded vermiculite was obtained from a vermiculite ore, available from Cometal, Inc, of New York, N.Y. The vermiculate ore was screened such that the fraction that passed through a 20 mesh screen but not a 50 mesh screen was collected. 54 grams of 20-50 mesh fraction of the vermiculite ore and 1500 ml tap water conditioned to 40° C. were added to a Waring Blender and mixed at low speed for 3 minutes. The vermiculite slurry was then mixed for an additional 3 minutes at high speed in 1 minute increments, allowing the blender motor to cool 3-5 between operations. 54 grams of SUPERWOOL 607 and 1000 conditioned tap water were then added to the blender and mixed for 3 to 5 seconds. The slurry was then transferred to a mixing vessel and the blender was rinsed with 1000 ml conditioned tap water to remove any remaining solids from the blender.

The slurry was then suspended and mixed with a paddle mixer at medium speed and 3 drops FOAMMASTER 111 defoamer added. 21.82 grams AIRFLEX 600BP latex was then added and allowed to disperse for 2-3 minutes. 10 grams of 50% alum solution was then added to precipitate the mix.

The precipitated mixture was then poured into a 8 in. by 8 in. handsheet mold having a 60 mesh screen. The water was drained from the mold to form a handsheet. The handsheet was then rolled under blotter paper with a rolling pin to remove excess water and pressed at 35 psi for 5 minutes between to 40 mesh screens on metal frames and dried in a 150° C. convection oven.

After equilibrating to room temperature and humidity overnight, a 1¾ in. by 1¾ in. sample was die cut from the handsheet for testing.

The die cut sample dimensions were measured in the x-y plane using a dial micrometer and then placed in a small muffle furnace set at 1000 degrees C. for 48 hrs. After cooling, the sample dimensions were again measured in the x-y plane. The area before and after heating as well as percent shrinkage were calculated from the micrometer measurements. The shrinkage was 4.3 percent.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A composition comprising:
   a) a micaceous binder in an amount of about 5 to about 80 weight percent on a dry weight basis, said micaceous binder consisting essentially of a crushed micaceous mineral that is non-intumescent; and
   b) biosoluble inorganic fibers in an amount of about 10 to about 60 weight percent on a dry weight basis,
   wherein said composition is in the form of a sheet material suitable for use as a mounting mat of the pollution control device or as an insulating material in an end cone region of a pollution control device.

2. The composition of claim 1, wherein said sheet material having an area in a X-Y plane, the area decreasing less than about 6 percent when said sheet material is heated to about 900° C.

3. The composition of claim 1, wherein said biosoluble inorganic fibers comprise about 45 to about 90 weight percent $SiO_2$, up to about 45 weight percent CaO, up to about 35 weight percent MgO, and less than 10 weight percent $Al_2O_3$ based on the weight of the biosoluble inorganic fibers.

4. The composition of claim 1, wherein said crushed micaceous mineral has a particle size less than about 150 micrometers.

5. The composition of claim 4, wherein said crushed micaceous mineral consists of expanded vermiculite in a crushed state, and said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

6. The composition of claim 1, further comprising non-respirable inorganic fibers in an amount up to about 15 weight percent on a dry weight basis, wherein the non-respirable inorganic fibers have an average diameter of at least about 3 micrometers.

7. The composition of claim 1, further comprising an intumescent material in an amount up to about 80 weight percent on a dry weight basis, wherein said intumescent material has an average particle size greater than about 300 micrometers.

8. The composition of claim 1, further comprising an intumescent material in an amount up to about 80 weight percent on a dry weight basis, wherein said intumescent material comprises a micaceous mineral having a particle size greater than about 150 micrometers.

9. The composition of claim 1, further comprising an intumescent material in an amount such that said composition is an intumescent composition.

10. The composition of claim 1, further comprising a polymeric binder in an amount of about 0.1 to about 15 weight percent on a dry weight basis.

11. The composition of claim 10, wherein said polymeric binder is an elastomer.

12. The composition of claim 1, further comprising polymeric fibers.

13. The composition of claim 1, wherein said composition is in the form of a sheet material having a multilayered construction.

14. The composition of claim 1, wherein said sheet material is intumescent and further comprises an edge protector.

15. The composition of claim 1, wherein said composition is free of respirable inorganic fibers that are durable.

16. An intumescent composition comprising:
a) a micaceous binder in an amount of about 15 to about 50 weight percent on a dry weight basis, wherein the micaceous binder consists of expanded vermiculite in a crushed state having a particle size less than about 150 micrometers;
b) biosoluble inorganic fibers in an amount of about 15 to about 40 weight percent on a dry weight basis; and
c) intumescent material in an amount of about 30 to about 60 weight percent on a dry weight basis, wherein the intumescent material comprises unexpanded vermiculite having a particle size greater than about 150 micrometers,
wherein said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

17. The composition claim 16, further comprising a polymeric binder in an amount of about 0.1 to about 15 weight percent on a dry weight basis.

18. A pollution control device comprising:
a) a housing;
b) a pollution control element disposed in the housing; and
c) a protective material disposed in a gap between at least a portion of the housing and a portion of the pollution control element, said a protective material comprising:
i) a micaceous binder in an amount of about 5 to about 80 weight percent on a dry weight basis, said micaceous binder being a crushed micaceous mineral that is non-intumescent; and
ii) biosoluble inorganic fibers in an amount of about 10 to about 60 weight percent on a dry weight basis,
wherein said protective material is in a form suitable for use as a mounting mat of said pollution control device or as an insulating material in an end cone region of said pollution control device.

19. The pollution control device of claim 18, wherein the protective material is in the form of a sheet material or a paste.

20. The pollution control device of claim 18, wherein said biosoluble inorganic fibers comprise about 45 to about 90 weight percent $SiO_2$, up to about 45 weight percent CaO, up to about 35 weight percent MgO, and less than 10 weight percent $Al_2O_3$ based on the weight of the biosoluble inorganic fibers.

21. The pollution control device of claim 18, wherein said micaceous binder is expanded vermiculite in a crushed state having a particle size less than about 150 micrometers, and said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

22. The pollution control device of claim 18, wherein said protective material further comprises an intumescent material in an amount such that said protective material is intumescent.

23. The pollution control device of claim 18, wherein said protective material further comprises non-respirable inorganic fibers in an amount up to about 15 weight percent on a dry weight basis.

24. The pollution control device of claim 18, wherein said protective material having an area in an X-Y plane, said area decreasing less than about 6 percent when said pollution control device is in use.

25. A pollution control device comprising a housing and insulating material disposed in said housing, said insulating material comprising a micaceous binder in an amount of about 5 to about 80 weight percent on a dry weight basis and biosoluble fibers in an amount of about 10 to about 60 weight percent on a dry weight basis, said micaceous binder consisting of expanded vermiculite in a crushed state that is non-intumescent and has a particle size less than about 150 micrometers, and said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

26. The pollution control device of claim 25, wherein said insulating material is cone shaped and disposed in an end cone region of said housing.

27. A method of making a pollution control device comprising
providing a housing and a pollution control element;
forming a protective packing material comprising a micaceous binder in an amount of about 5 to about 80 weight percent on a dry weight basis and biosoluble inorganic fibers in an amount of about 10 to about 60 weight percent on a dry weight basis, said protective packing material being in sheet form, and said micaceous binder consisting of a crushed micaceous mineral that is non-intumescent;

disposing the pollution control element in the housing; and positioning the protective packing material between at least a portion of the pollution control element and the housing such that the protective packing material mounts the pollution control element in the housing, wherein said micaceous mineral has a particle size less than about 150 micrometers and consists essentially of expanded vermiculite in a crushed state, and said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

28. The method of claim 27, wherein the protective packing material is wrapped completely around at least a portion of the pollution control element.

29. The method of claim 27, wherein the protective packing material further comprises an intumescent material in an amount such that the protective packing material is intumescent.

30. A method of making a sheet material comprising:

forming an aqueous slurry comprising a micaceous binder in an amount of about 5 weight percent to about 80 weight percent on a dry weight basis and biosoluble inorganic fibers in an amount of about 10 to about 60 weight percent on a dry weight basis, said micaceous binder consisting essentially of a crushed micaceous mineral that is non-intumescent;

adding a coagulating agent to form a coagulated slurry; and removing water from the coagulated slurry to form a sheet material.

31. The pollution control device of claim 18, wherein the protective material is in the form of a sheet material.

32. The composition of claim 1, wherein said crushed micaceous mineral has a particle size less than about 150 micrometers and consists essentially of expanded vermiculite in a crushed state, and said micaceous binder can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

* * * * *

UNITED STATES PATENT AND TRADEMARK OFFICE
CERTIFICATE OF CORRECTION

| | |
|---|---|
| PATENT NO. | : 8,673,229 B2 |
| APPLICATION NO. | : 10/488710 |
| DATED | : March 18, 2014 |
| INVENTOR(S) | : Gary Howorth |

Page 1 of 1

It is certified that error appears in the above-identified patent and that said Letters Patent is hereby corrected as shown below:

Title Page 2, Item (56) Col. 1 (OTHER PUBLICATIONS), line 13, delete "Univeristy" and insert -- University --

Title Page 2, Item (56) Col. 1 (OTHER PUBLICATIONS), line 14, delete "33-40" and insert -- 35-40 --

In the Specification

Col. 6, line 18, delete "Institut" and insert -- Institute --

Col. 7, line 30, delete "mica" and insert -- mica. --

Col. 13, line 50, delete "(Pilington," and insert -- (Pilkington, --

Col. 15, line 58, delete "Extensiometer" and insert -- Extensometer --

Col. 17, line 26, delete "The" and insert -- These --

Col. 17, line 39, delete "Arfk.," and insert -- AR, --

In the Claims

Col. 20, line 1, In Claim 17, delete "composition" and insert -- composition of --

Signed and Sealed this
Eighth Day of July, 2014

Michelle K. Lee
*Deputy Director of the United States Patent and Trademark Office*